(12) United States Patent
Albisu

(10) Patent No.: US 8,788,349 B2
(45) Date of Patent: *Jul. 22, 2014

(54) MOBILE PAYMENT USING PICTURE MESSAGING

(71) Applicant: AT&T Intellectual Property I, L.P., Atlanta, GA (US)

(72) Inventor: Luis Francisco Albisu, Fairfax Station, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/886,572

(22) Filed: May 3, 2013

(65) Prior Publication Data

US 2013/0246200 A1    Sep. 19, 2013

Related U.S. Application Data

(63) Continuation of application No. 12/872,863, filed on Aug. 31, 2010, now Pat. No. 8,438,063.

(51) Int. Cl.
*G06Q 20/00* (2012.01)
*H04L 29/06* (2006.01)

(52) U.S. Cl.
CPC ........ *H04L 63/0861* (2013.01); *H04L 63/0869* (2013.01)
USPC .......................................................... 705/16

(58) Field of Classification Search
CPC ..................... H04L 63/0861; H04L 363/0869
USPC .............................................. 705/44, 75, 76
See application file for complete search history.

(56) References Cited

U.S. PATENT DOCUMENTS

| | | | |
|---|---|---|---|
| 6,226,364 B1 | 5/2001 | O'Neil | |
| 7,886,155 B2 | 2/2011 | Fiske | |
| 7,895,445 B1 | 2/2011 | Albanese | |
| 7,900,265 B1 | 3/2011 | Plotkin | |

(Continued)

OTHER PUBLICATIONS

"Cryptomathic: Use your mobile phone to pay for your groceries and get cash from ATMs; Scandinavian partnership launches secure payment mechanism that turns mobile phones into mobile wallets." M2 Presswire Feb. 19, 2002 ProQuest Newsstand, ProQuest. Web. Jan. 27, 2011.*

(Continued)

*Primary Examiner* — Scott Zare
*Assistant Examiner* — Rokib Masud
(74) *Attorney, Agent, or Firm* — Hartman & Citrin LLC

(57) ABSTRACT

A mobile device equipped with at least a display and an input is used to connect to a server on the mobile network. Upon authentication of a user of the mobile device, the server generates the payment key, encodes the key in an image, such as a bar code, and transmits the image to the mobile device. The user holds the display of the mobile device up to an optical scanner at a POS terminal. Logic on the POS terminal extracts the payment key from the image, and uses the payment key to bill the user. The POS terminal transmits the bill with the payment key to the server on the network. The server ensures that the key is active, and debits an account for the user based on the amount presented in the bill. The key is de-activated after a specified time period or one use, whichever occurs first.

20 Claims, 8 Drawing Sheets

(56) References Cited

U.S. PATENT DOCUMENTS

| | | |
|---|---|---|
| 7,920,851 B2 | 4/2011 | Moshir |
| 2008/0179390 A1 | 7/2008 | Harjani |
| 2009/0006254 A1* | 1/2009 | Mumm et al. ............... 705/44 |
| 2009/0182634 A1* | 7/2009 | Park et al. .................. 705/14 |
| 2011/0071922 A1 | 3/2011 | Hirson |
| 2011/0078762 A1 | 3/2011 | Bijlsma |
| 2011/0251892 A1* | 10/2011 | Laracey ................. 705/14.51 |

OTHER PUBLICATIONS

Provisional Application 61/322477 filed on Apr. 9, 2010.
Provisional Application 61/362567 filed on Jul. 8, 2010.
U.S. Office Action dated Jan. 5, 2012 in U.S. Appl. No. 12/872,863.
U.S. Office Action dated Jul. 17, 2012 in U.S. Appl. No. 12/872,863.
U.S. Notice of Allowance dated Jan. 8, 2013 in Application No. 12/872,863.

* cited by examiner

MOBILE PAYMENT USING PICTURE MESSAGING

CROSS REFERENCE TO RELATED APPLICATION

This patent application is a Continuation of and claims priority to U.S. patent application Ser. No. 12/872,863, now U.S. Pat. No. 8,438,063, entitled "Mobile Payment Using Picture Messaging," filed Aug. 31, 2010, which is herein incorporated by reference in its entirety.

BACKGROUND OF THE INVENTION

1. Field of the Invention

The present invention relates to mobile devices. In particular, the present invention relates to authenticating and making payments at a point-of-sale (POS) using a mobile device.

2. Background of the Invention

The information revolution is taking over, and certain needs are universal. For instance, transmitting identity information is a universal need having different approaches. Purchasing goods and services at a point of sale (POS) is another universal need. Especially prevalent in many societies is the ability to make payments without using cash. Credit cards are a prime example of such payment methods. However, credit cards can be lost, stolen, and can be forgotten.

Mobile payment is becoming popular in developed nations. There are estimated to be 3.3 billion active cellular telephones in use across the world today, and mobile phones are increasingly being used to process a payment at a POS. Mobile payment typically includes a near-field communication (NFC) system, whereby an NFC-equipped phone is waved in front of an NFC scanner, such as a radio frequency identification (RFID) scanner, and an amount is debited from the NFC circuitry or secure element embedded within the phone. However, this requires NFC-equipped phones, which leads to added costs to modify phones and POS terminals. Further, the information stored on the phone itself leads to insecurity. Sensitive information can be stolen from the phone, or the phone itself can be stolen and/or hacked.

What is therefore needed is a secure system and method for enabling mobile payments.

SUMMARY OF THE INVENTION

The present invention solves the above problems by transmitting a unique key in the form of a picture message to a mobile device, to enable a transaction at a POS terminal. When a user is ready to make a purchase, he uses a mobile device equipped with at least a display and an input to connect to a server on the mobile network. The user is authenticated by providing a unique identifier via an input on the device such as a keypad and/or a microphone. Upon authentication, the server generates a payment key in the form of an image, for instance a bar code, and transmits the image to the mobile device via a picture message or equivalent means. The user places the display of the mobile device near a scanner at the POS terminal. The scanner includes logic that extracts the payment key from the bar code, and the POS terminal uses the payment key to bill the user. The POS terminal transmits the bill with the payment key to the server on the network. The server ensures that the key is active, and debits an account for the user based on the amount presented in the bill. The user can be billed periodically by an operator of the cellular network for his purchases made at POS terminals.

Advantageously, using picture messaging enables most mobile devices to be used as a payment device, not just NFC-equipped phones. Advantageously, the key is deactivated after a specified time period or after one use, thereby ensuring that any hackers/crackers will not be able to conduct transactions using the key. Besides simply identifying a user or a transaction, the key may additionally include a credit card number, bank account and routing numbers, or be a temporary key that is tied to a particular credit card or bank account. Advantageously, the scanner can be inexpensively incorporated into existing POS terminals as added hardware, software, or any combination of the two. Advantageously, a user can program a maximum amount per transaction to prevent abuse by an operator of the POS terminal or other entities. Advantageously, a user can enable an authorization method, whereby the server on the network transmits an authorization request of the amount to the user before the user is billed. The authorization request can be triggered by transactions exceeding a predetermined amount adjustable by the user.

In one exemplary embodiment, the present invention is a system for making a payment using a mobile device including a display, an input, and a transceiver for communicating across a network. A point-of-sale (POS) terminal includes a scanner for scanning a payment key displayed on the display of the mobile device, logic for generating a bill including the scanned payment key and an amount to be charged, and a transceiver for transmitting the bill across the network. A server on the network includes logic for authenticating a user of the mobile device, generating the payment key in response to a request from the mobile device, and charging a user account upon receipt of the bill from the POS terminal. The system includes an authentication database, wherein the server authenticates the user by comparing a unique identifier of the user with the authentication database. The unique identifier is one or more of a username, a password, and a biometric identifier. The payment key can be embedded in a bar code, wherein the scanner at the POS terminal translates the bar code into an alphanumeric string.

In another exemplary embodiment, the present invention is a method for making a payment using a mobile device, including receiving a key request from the mobile device, authenticating a user of the mobile device, generating a payment key, transmitting the payment key to the mobile device, receiving from a point-of-sale (POS) terminal a bill, the bill including the payment key and an amount to be charged, determining that the received key is valid, and debiting the amount to be charged from a user account associated with the user. Authenticating the user may further include comparing a unique identifier received from the mobile device with an authentication database.

In yet another exemplary embodiment, the present invention is a method for charging a user at a point-of-sale (POS) terminal including scanning an image displayed on a display of a mobile device, extracting a payment key from the image, generating a bill including the payment key and an amount to be charged, transmitting the bill to a server across a network, and receiving a confirmation from the server that the user is billed. The method further includes receiving an insufficient funds notification from the server, and suggesting an alternative payment method to the user.

DETAILED DESCRIPTION OF THE INVENTION

Figure 1:
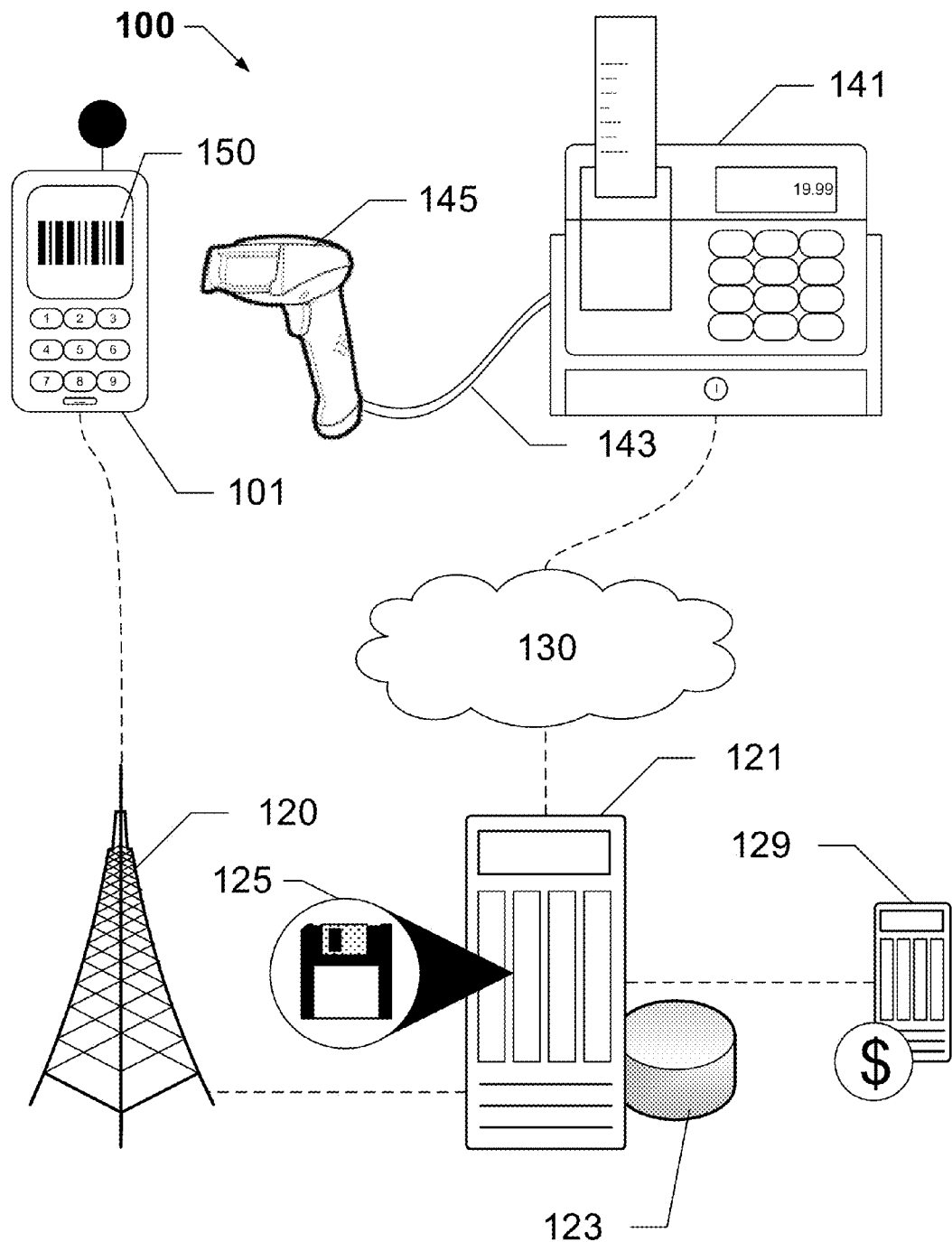
FIG. 1 shows a system for making mobile payments using picture messaging, according to an exemplary embodiment of the present invention.

The present invention presents a novel technique for mobile payment. An image, such as a bar code, contains a unique payment key to enable a transaction at a POS terminal. A mobile device equipped with at least a display and an input is used to connect to a server on the mobile network. Upon authentication of a user of the mobile device, the server generates the payment key, generates an image including the payment key, and transmits the image to the mobile device. The user holds the display of the mobile device close to a scanner at the POS terminal. The scanner or the DTMF terminal includes logic that extracts the payment key from the scanned image. Logic on the POS terminal generates a bill including the payment key and a total amount to be charged, and transmits the bill to the server on the network. The server ensures that the key is active and a valid match with the generated key, and debits an account for the user based on the amount presented in the bill. The key is further de-activated after a one-time use or a specified time period, thereby preventing any unauthorized individuals from conducting a transaction using the key. The image scanning and key extraction mechanisms can be incorporated into existing POS terminals as additional hardware, software, or combinations thereof. A user can program a maximum amount per transaction to prevent abuse by an operator of the POS terminal or other entities. Further, a user can enable an authorization method, whereby the server on the network transmits an authorization request of the amount to the user before the user is billed. The authorization request can be triggered by transactions exceeding a predetermined amount adjustable by the user.

As used herein and throughout this disclosure, the term "mobile device" refers to any electronic device capable of communicating across a mobile network. A mobile device may have a processor, a memory, a transceiver, an input, and an output. Examples of such devices include cellular telephones, personal digital assistants (PDAs), portable computers, etc. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories). A transceiver includes but is not limited to cellular, GPRS, Bluetooth, and Wi-Fi transceivers.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

Mobile devices communicate with each other and with other elements via a network, for instance, a cellular network. A "network" can include broadband wide-area networks, local-area networks, and personal area networks. Communication across a network can be packet-based or use radio and frequency/amplitude modulations using appropriate analog-digital-analog converters and other elements. Examples of radio networks include GSM, CDMA, Wi-Fi and BLUETOOTH (RTM) networks, with communication being enabled by transceivers. A network typically includes a plurality of elements such as servers that host logic for performing tasks on the network. Servers may be placed at several logical points on the network. Servers may further be in communication with databases and can enable communication devices to access the contents of a database. For instance, an authentication server hosts or is in communication with a database having authentication information for users of a mobile network. A "user account" may include several attributes for a particular user, including a unique identifier of the mobile device(s) owned by the user, relationships with other users, call data records, bank account information, etc. A billing server may host a user account for the user to which value is added or removed based on the user's usage of services. One of these services includes mobile payment. In exemplary mobile payment systems, a user account hosted at a billing server is debited or credited based upon transactions performed by a user using their mobile device as a payment method.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern. Method steps (S132, S232, etc.) do not share the same characteristics and functions.

FIG. 1 shows a system 100 for making mobile payments, according to an exemplary embodiment of the present invention. System 100 includes a mobile device 101 in communication with a cellular radio network 120. Radio network 120 includes all necessary network elements of a UMTS, CDMA, or equivalent network. Via radio network 120, mobile device 101 can connect to authentication server 121, including database 123 storing a user account for a user of mobile device 101. Server 121 can communicate with a billing server/system 129. Moreover, a point-of-sale (POS) terminal 141 including a scanner 145 coupled via an interface cable 143 is in communication with server 121 via a network 130. POS terminal 141 therefore includes a transceiver (not shown) enabling communication across network 130.

To make a mobile payment, a user of mobile device 101 requests a payment key from server 121. The request is initiated for instance by making a telephone call across radio network 120 to server 121, and interacting with an Interactive Voice Response (IVR) system on server 121. Server 121 authenticates the user of mobile device 101 by requesting credentials from the user. Server 121 compares the received credentials with authentication information stored on database 123. The authentication information may be a username and password, a pin code, a biometric identifier of the user, etc. When authenticated, the user requests a payment key from server 121 by, for instance, pressing a key on a keypad of mobile device 121, or using a voice command. Server 121 generates a payment key associated with the user and with mobile device 101, encodes the payment key in an image 150 such as a bar code, and transmits image 150 to mobile device 101. The payment key is a one-time key, and is valid for one purchase or a prescribed time period, whichever occurs first, determined by a service provider or by the user. User of mobile device 101 holds the display of mobile device 101 displaying image 150 in front of scanner 145. Scanner 145 includes logic for extracting the payment key from image 150, and transmitting the payment key to POS terminal 141 via interface cable 143. POS terminal 141 combines the payment key along with a total amount for the user's purchase into a bill, and transmits the bill to server 121 via network 130. Server 121 receives the bill and extracts the payment key received with the bill to determine the user account that is to be charged. Logic within server 121 further ensures that the payment key is still valid before fulfilling the transaction. If the payment key is valid and if the user account on database 123 (or on billing server 129) has sufficient funds, server 121 accepts the transaction, debits the account of the user, and transmits a purchase confirmation to POS terminal 141. If the payment key is expired, or if there are insufficient funds, server 121 returns an error message to POS terminal 141. Server 121 may debit the amount available in the user's account and prompt POS terminal 141 to request a different payment method for the remainder of the total amount of the bill. Alternatively, the amount may simply be added to the user's mobile bill, and the service provider bills the user on a periodic basis for the purchases made by the user at POS terminals. The service provider/network operator would then credit the retailer/operator of the POS terminal for the amount billed.

Communication between mobile device 101 and server 121 is shown to occur via radio network 120, but can occur via a packet based network, femtocell, or an equivalent means. Other network elements that are not shown may include base stations, radio network controllers, home location registers, switching centers, gateways, etc. For instance, a messaging server can be invoked by authentication server 121 to transmit a picture message, Multimedia Messaging Service (MMS) message, or Enhanced Messaging Service (EMS) message that contains the image to mobile device 101. Further, in the case of an IP Multimedia System, authentication server 121 sits within an IMS core network accessible via a 3G network, and hosts an application that communicates directly with an interface provided on mobile device 101. In this case, image 150 can be transmitted to mobile device 101 via the 3G network. Similarly, network 130 is any packet-based network that enables POS 141 to communicate with server 121. Other network elements not shown include broadband modems, fiber-optic nodes, routers, gateways, IP backbones, etc. In one exemplary embodiment, network 130 is the internet, whereby server 121 has a unique IP address and communicates with POS 141 via a secure IP connection such as a tunnel, or equivalent. Server 121 is further in communication with billing server 129 across one or more network elements residing on a back end of the operator's network. A user account for a user of mobile device 101 can be stored on database 123 within server 121, or on billing server 129. The user account includes a combination of different databases for a user distributed at different servers across the network.

Scanner 145 is a separate entity that couples with POS terminal 141 via a USB or equivalent interface, and can further incorporate an indicator such as an LED light that shows a successful receipt of a correctly formatted bar code. This formatting may be in the form of cyclical redundancy checking (CRC) or other internal verification techniques. The bar code itself may be a standard linear bar code such as a UPC, a matrix (two-dimensional) bar code such as a "quick response" code, a glyph, or any color or black and white image capable of storing a unique payment key that can be extracted by image processing logic stored either on scanner 145 or POS 141. The generation of the payment key may include a random number generator or other algorithm on server 121. The generation of the payment key may include embedding the telephone number or other unique ID of the user into the payment key before encoding the bar code.

Figures 2A, 2B:
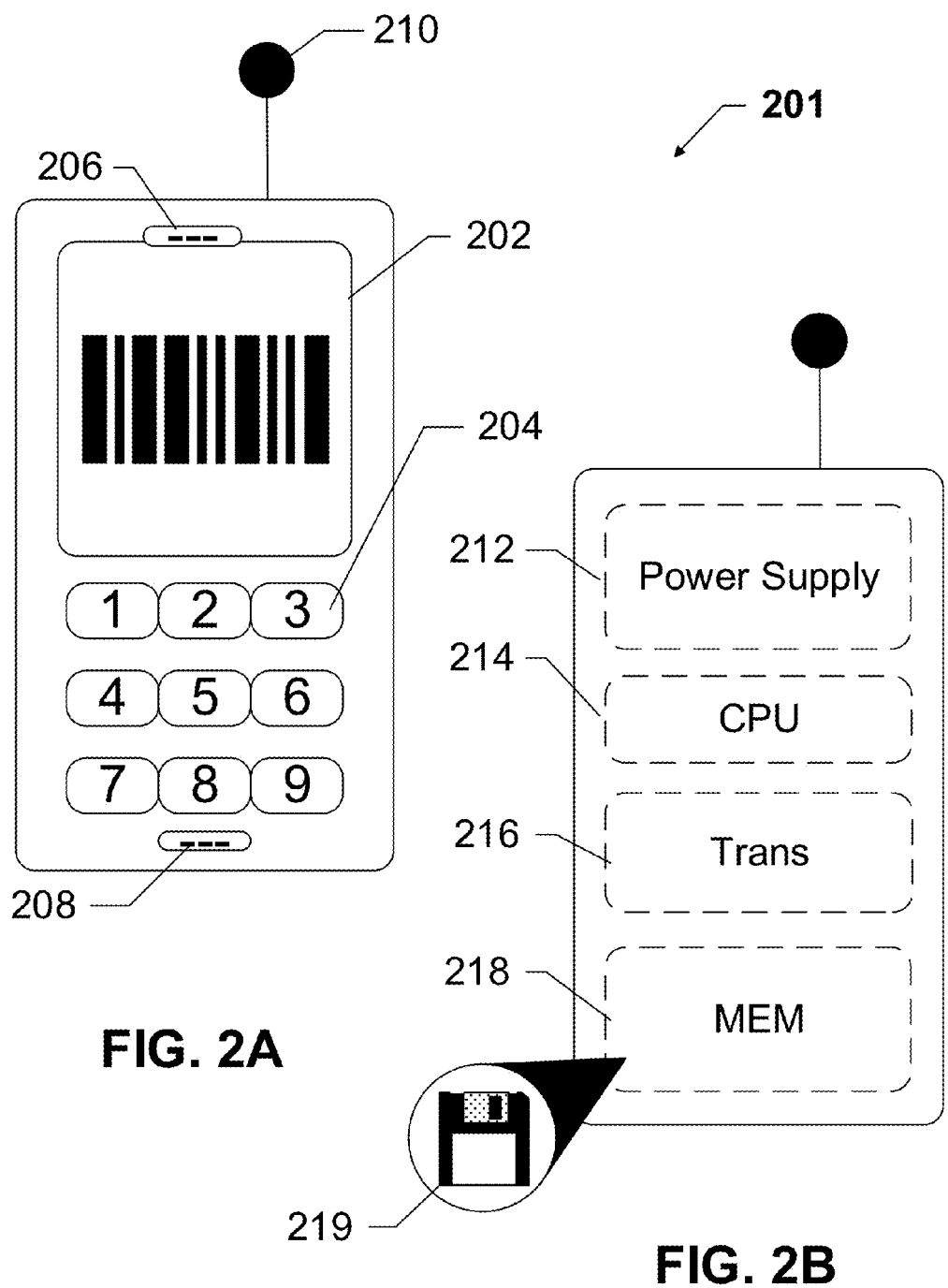
FIGS. 2A and 2B show a mobile device for making mobile payments, according to an exemplary embodiment of the present invention.

FIGS. 2A and 2B respectively show the exterior and interior components of a mobile device 201, according to an exemplary embodiment of the present invention. Mobile device 201 includes a display 202, a keypad 204, a speaker 206, a microphone 208, and an antenna 210. Mobile device 201 further includes a power supply 212, a central processing unit (CPU) 214, a transceiver 216, and a memory 218. Memory 218 stores logic 219 for operating the components of mobile device 200. Display 202 is an LCD or LED or other type of display on which a user can view selections, numbers, letters, etc. Display 202 can also be a touchscreen, thereby being used as an input device. Keypad 204 is typically used as an input device, for instance, to type a phone number or a message. Keypad 204 may be a numerical keypad, a QWERTY keyboard, etc. Keypad 204 enables a user to transmit DTMF tones across a network to request a payment key, input a password, etc. The keypad may be implemented as touch sensitive areas on display 202. Speaker 206 provides an output for mobile device 201, for instance, by outputting instructions from an IVR system hosted at an authentication server on the network. Speaker 206 can be a combination of a small speaker for holding phone conversations, and a larger speaker for playing music, indicators, etc. Microphone 208 allows the user to verbally communicate with others using mobile device 201. Microphone 208 may further be used to transmit voice commands to an IVR system on the network, for instance, to request a payment key, provide a biometric input, etc. Antenna 210 is a transducer designed to transmit or receive electromagnetic waves to and from a network. In conjunction with antenna 210, transceiver 216 allows mobile device 201 to wirelessly communicate with a network, or with other wireless devices. Transceiver 216 may communicate using cellular radio frequencies (RF), WiFi, BLUETOOTH, infrared signals, etc. Power supply 212 provides power to each of the components of mobile device 201, and can include a battery, as well as an interface to an external power supply. CPU 214 controls components of mobile device 201 according to instructions in logic 219 stored on memory 218. Memory 218 comprises any computer readable medium, such as RAM, ROM, etc. Logic 219, at its minimum, enables operation of the components of mobile device 201 and to provide a user interface displayed on screen 202. Logic 219 can further include an application to request payment keys from and provide credentials to a server on the network, in addition to the IVR voice commands disclosed above. For added security, the mobile device can be programmed to erase the payment key after a one-time use or a specified time period.

Figure 3:
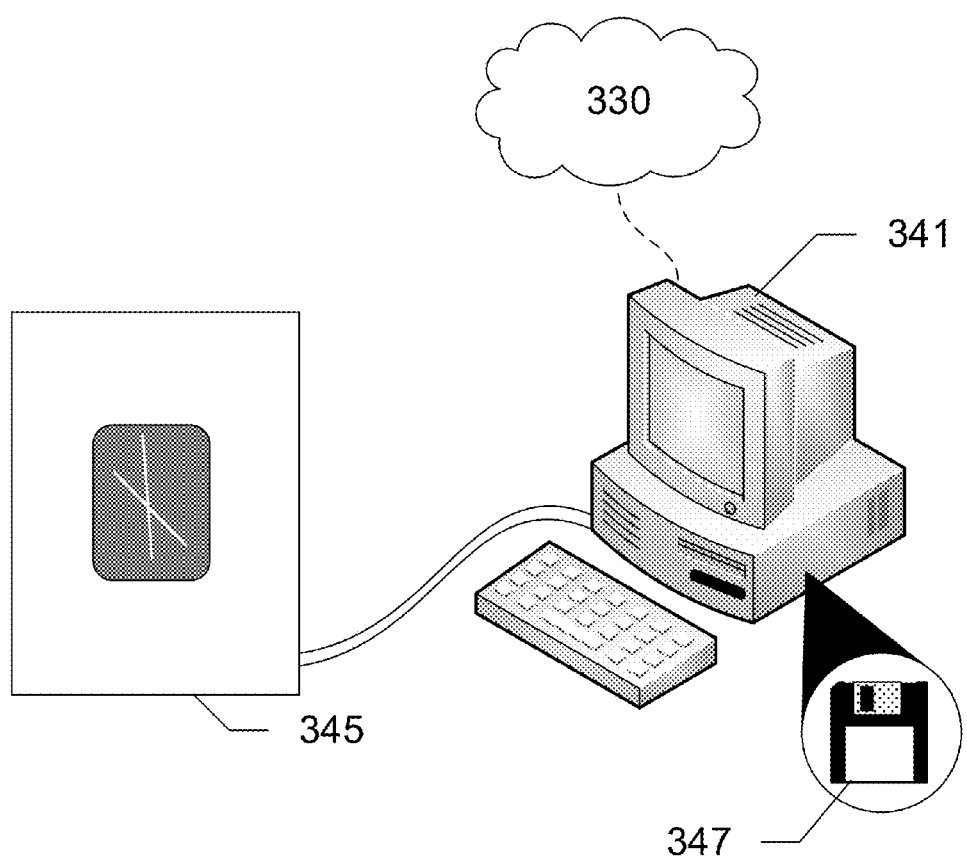
FIG. 3 shows a point of sale (POS) terminal with a scanner, according to an exemplary embodiment of the present invention.

FIG. 3 shows a point of sale terminal with an optical scanner, according to an exemplary embodiment of the present invention. POS terminal 341 includes an optical scanner 345, which is shown as a flatbed or wall-mounted scanner, as opposed to the handheld scanner of FIG. 1. For instance, scanner 345 is a self-service checkout at a grocery store. POS terminal 341 further includes logic 347 to enable usage of scanner 345, extraction of a payment key from a scanned image, and generation of a bill to be submitted across a network 330. Not shown is a transceiver within POS terminal 341 enabling communication across network 330. For instance, network 330 can be the internet, in which case the transceiver would be a network interface card (NIC) coupled to a broadband modem. Other methods of connecting to a network are possible. Logic 347 enables an operator of POS terminal 341, or a cashier, to total the purchases made by a user and generate a total amount for the user's purchase. An image is scanned from a mobile device by optical scanner 345, and decoded to extract the payment key. Logic 347 generates a bill including the payment key and the total amount to be charged to the user for the purchase. The bill can further include other information such as a terminal identifier, description of the purchase, instructions, notes, etc. The bill is transmitted to a server across network 330. If the server determines that the key is valid, a confirmation message is returned to POS terminal 341, or an insufficient funds notification is generated at the terminal if the confirmation message indicates that the user has insufficient funds.

As described above, logic on the server processes the payment key received in the bill to determine the originating mobile device and corresponding user account. The authentication server or a billing server debits the user's account by the amount in the bill. If the amount is above a defined threshold, the user of the mobile device may be prompted to confirm or authorize the charge. This is performed by transmitting an authorization request to the mobile device associated with the payment key. The user's response can include a passcode, biometric identifier, or simply a confirmation that the amount is correct. If the account of the user does not contain sufficient funds, the account may be debited the available amount, or the transaction denied. The POS terminal is notified in either case of a remaining amount the user must pay.

Figure 4:
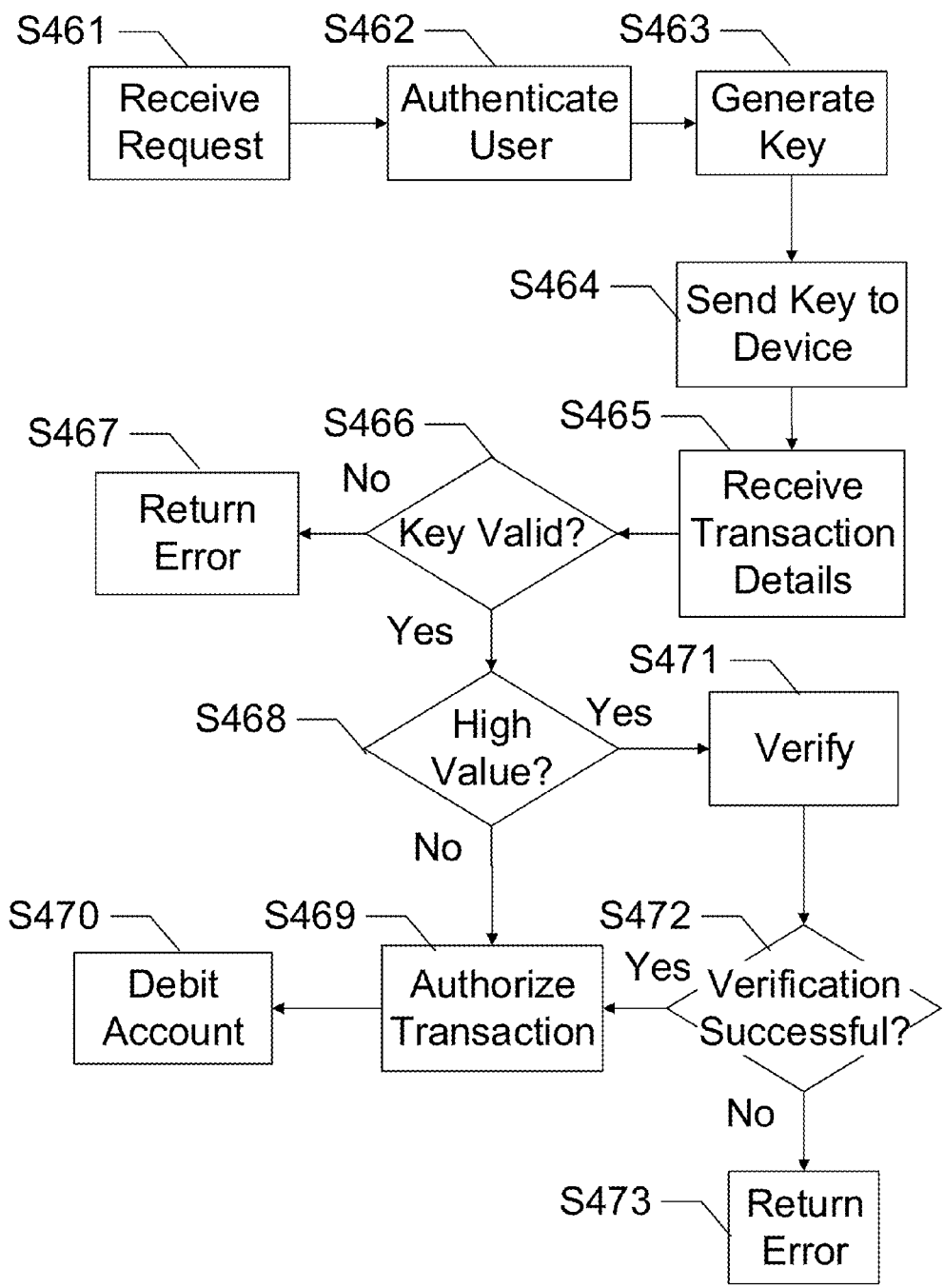
FIG. 4 shows a method for processing mobile payments at a server, according to an exemplary embodiment of the present invention.

FIG. 4 shows a method for processing mobile payments at a server, according to an exemplary embodiment of the present invention. The method begins with a request for a payment key S461 received at the server on the network. The request is received from a mobile device dialing into the server and navigating a menu tree, for instance, an IVR system stored on the server. A user of the mobile device dials a specific number depending upon the purchase being made. For instance, every retailer has a unique telephone number for the user to dial to get the payment key. Alternatively, a user may dial the same number every time to reach the authentication server, and inputs a store ID, wherein the generated payment key corresponds to the particular store ID. Other methods for connecting the purchase to a particular store or retailer will be apparent to those skilled in the art in light of this disclosure.

In either case, the user is authenticated S462 using one or more of several methods, including a username/password combination, a biometric identifier such as voice recognition, etc. The voice recognition can prompt the user to speak a random string of words every time, to prevent fraudulent transactions by unauthorized users who have recorded the user's voice. The authentication is verified by comparing with a database of known unique identifiers for the user. Upon a successful authentication, a payment key is generated S463. The payment key is a unique string of alphanumeric or similar characters, and can be encoded into an image such as a bar code. The payment key is valid for only one transaction or a short period of time sufficient to complete a transaction at a POS terminal, whichever occurs first. If a transaction is unsuccessful, a user can request a new payment key, at which point the previous payment key is rendered invalid.

The image containing the payment key is transmitted to the mobile device S464 via a message, such as a picture message, or downloaded to the mobile device via an application provisioned on the mobile device. The image is displayed at the mobile device, and scanned by a scanner coupled to the POS terminal. Logic extracts the payment key from the scanned image, and generates a bill including at least the payment key and an amount to be charged to the user for the purchase, etc. that the user has made. The bill can include other information such as a POS terminal identifier, a store ID, and other metadata such as date, time, location, etc. The bill is received S465 by the server. The server determines if the key is valid S466, i.e. that the key is not expired or previously used. If the key is invalid, an error message is returned S467. If the key is valid, then an authorization loop is initiated S468. The authorization loop determines if the amount to be charged is higher than a predefined amount determined either by the user, or by a provider. If the amount is larger than the threshold, then an authorization request is submitted S471 to the user at the mobile device used to initiate the transaction. The authorization request requires a positive response for the transaction to proceed. If the request receives a negative response or no response at all at S472, then the transaction is canceled at S473. This provides additional security against unauthorized large transactions. If, however, the request returns a positive response from the user, then the transaction is authorized S469. The user account is debited S470, and the transaction is complete. Conversely, at step S468, if the amount is lower than a predefined threshold amount, then the transaction is automatically authorized S469 without requiring an authorization from the user, and the transaction is fulfilled S470.

Figure 5:
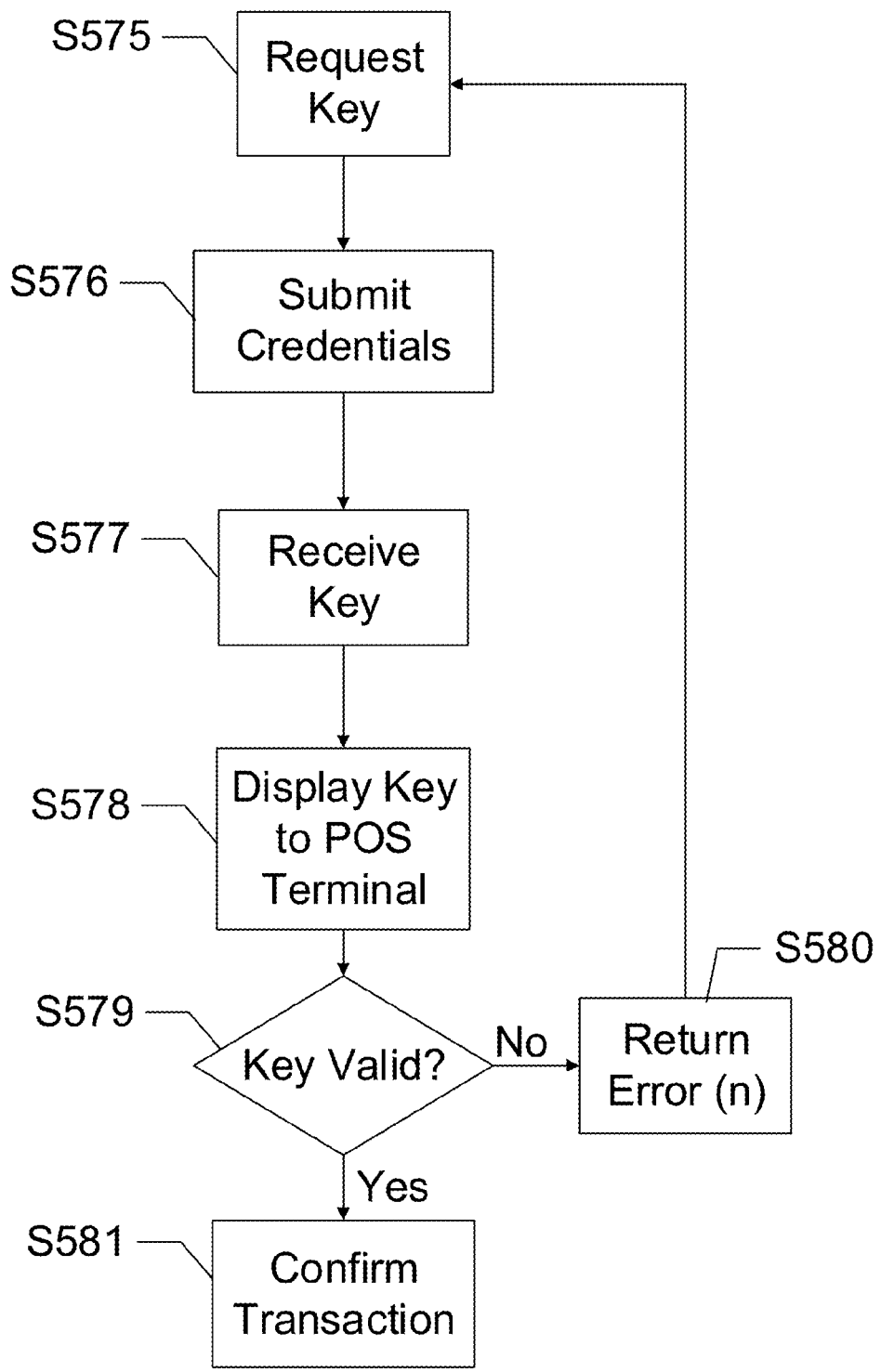
FIG. 5 shows a method for making mobile payments at a mobile device, according to an exemplary embodiment of the present invention.

FIG. 5 shows a method for making mobile payments at a mobile device, according to an exemplary embodiment of the present invention. From the perspective of a user of the mobile device, the method starts with a request for a payment key S575 submitted at the mobile device to a server on the network. For instance, the user dials into the server, navigates a menu tree using DTMF tones or voice commands, and requests a payment key. The number dialed can be provided by the retailer/operator of the POS terminal, or provided by the provider of the mobile payment service. In the latter case, the user would be prompted to input a store ID or equivalent information to identify the store. Once connected to the authentication server, the user has to authenticate S576 using one or more of several credentials, including a username/password combination, a biometric identifier such as voice recognition, etc. The voice recognition can prompt the user to speak a random string of words every time, to prevent fraudulent transactions by unauthorized users who have recorded the user's voice. A name/password is spoken and recognized by an IVR system, or typed in using a keypad on the mobile device.

Upon a successful authentication, a payment key is received S577 at the mobile device. The payment key is a unique string of alphanumeric or similar characters, and can be represented by a bar code received via a picture message. The payment key is valid for only a short period of time sufficient to complete a transaction at a POS terminal. If a transaction is unsuccessful, a user can request an alternate payment key, at which point the previous payment key is rendered invalid. The user holds the display of the mobile device up to a scanner coupled to the POS terminal. The POS terminal extracts the payment key from the bar code, and determines if the received key is properly formatted S579. If the key does not appear to be in the proper format, for instance if the image was not completely scanned, an error S580 is returned, and the user can request S575 a new key. The error may occur up to n times, after which the user account maybe locked, or another action performed to prevent fraudulent transactions. If the key is valid, the POS terminal submits to the server a bill including the payment key and an amount to be charged to the user for the purchase, etc. that the user has made. Upon a successful transaction, a confirmation message S581 is received by the user, notifying the user that the user's account has been debited by the amount to be charged.

Alternatively, an authorization loop can be invoked to determine if the amount to be charged is higher than a predefined amount. If the amount is larger than the threshold, then an authorization request is received at the mobile device. The authorization request requires a positive response for the transaction to proceed. The user can ignore the request or return a negative response to cancel the transaction, or return a positive response to authorize the transaction.

Figure 6:
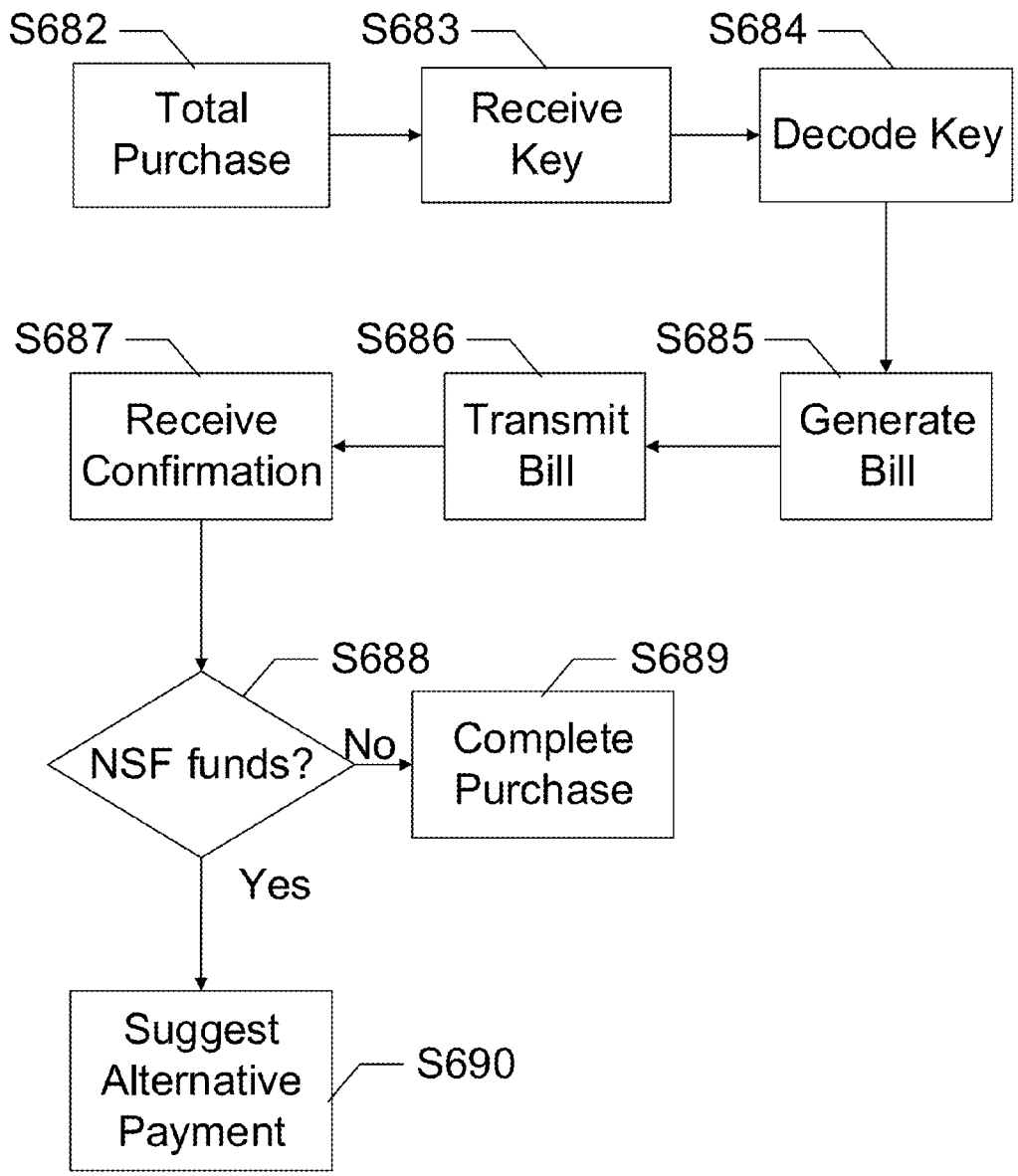
FIG. 6 shows a method for processing mobile payments at a POS terminal, according to an exemplary embodiment of the present invention.

FIG. 6 shows a method for processing mobile payments at a POS terminal, according to an exemplary embodiment of the present invention. The method begins at the POS terminal with total amount being generated S682 for the user's purchase. When the purchase is ready to be processed, a payment key is received S683 from a mobile device via an image shown on a display of the mobile device. The image can be a bar code or any other image having a payment key encoded therein. An optical scanner coupled to the POS terminal scans the image, and decodes S684 the image to extract the payment key. Alternatively, the image is transmitted to the POS terminal, where the actual decoding takes place via logic on a memory of the POS terminal. The POS terminal generates a bill S685 including the payment key and the total amount to be charged to the user for the purchase. The bill can further include other information such as a description of the purchase, instructions, notes, etc. The bill is transmitted S686 to a server on the network. The transmission can occur via the internet or via a phone connection, such as PSTN or cellular network. If the server determines that the key is valid, a confirmation message is returned to the POS terminal S687. Further, an insufficient funds loop S688 is initiated if the confirmation message returned at step S687 shows that the user has insufficient funds. If there are sufficient funds, the purchase is completed S689. If, however, there are insufficient funds in a user account, then the amount available may be charged, and a second bill is presented to the user to provide an alternative payment method S690.

Alternatively, the POS terminal includes an indicator to show whether or not a payment key is successfully extracted from the bar code. This indicator can be in the form of an LED light that shines, for instance, green if a payment key is successfully received and red if the payment key is incomplete. Payment keys can be checked via internal consistency checks such a cyclical redundancy checks (CRC). The user would request another payment key, thereby voiding the first key, and plays back a new payment key to the POS terminal.

Figure 7:
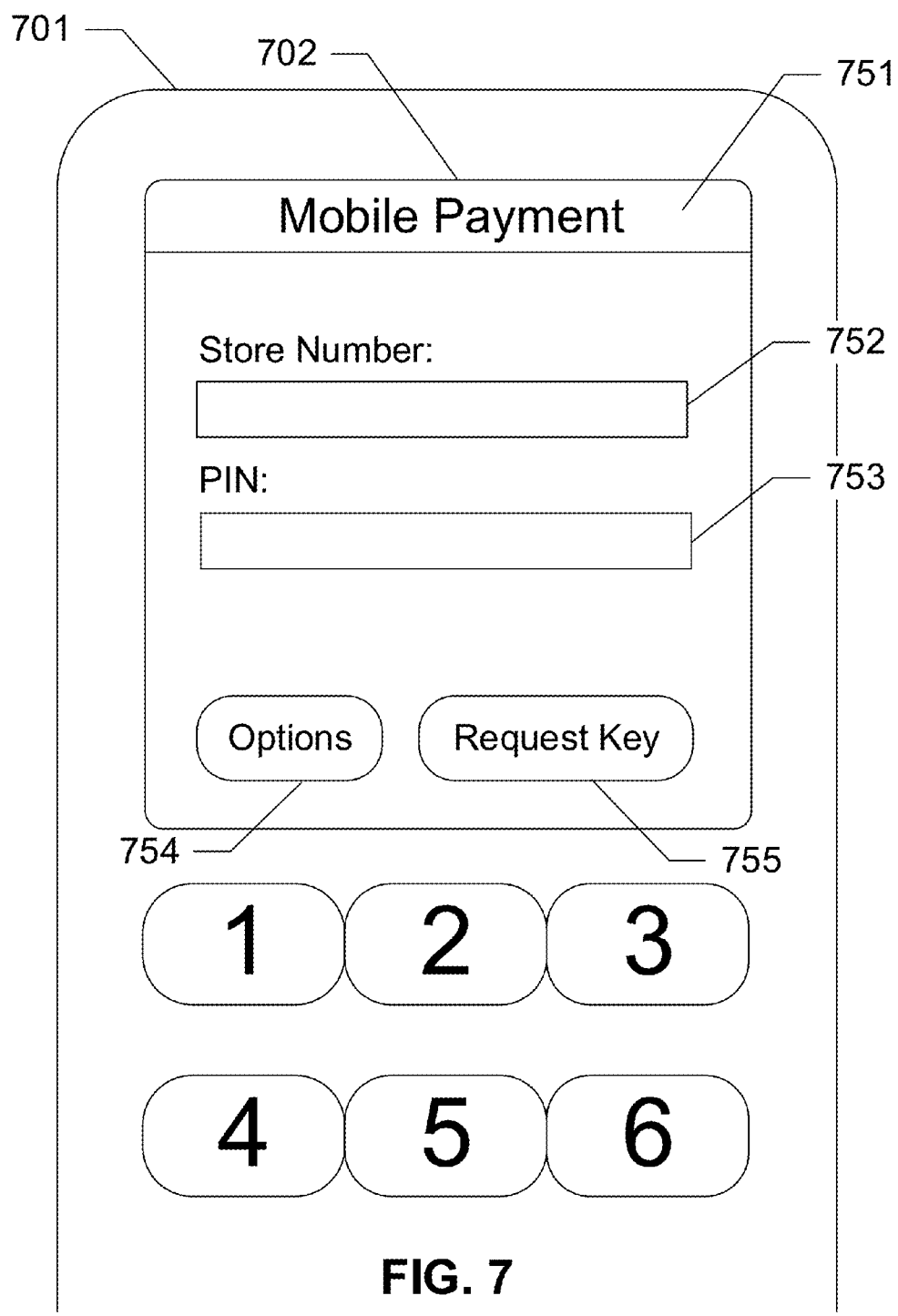
FIG. 7 shows a screenshot of an application interface for making mobile payments on a mobile device, according to an exemplary embodiment of the present invention.

FIG. 7 shows an application for requesting a payment key from a mobile device, according to an exemplary embodiment of the present invention. Mobile device 701 has a screen 702 displaying a mobile payment application 751. A user of mobile device 701 loads the application, and inputs a store number 752 and a PIN or equivalent credential 753. The store number 752 is a unique identifier for the store, and could be a telephone number assigned to the store for requesting payment keys via the telephone, or some other identifier. Basically, the store number 752 provides the authentication server with an idea as to which store will be submitting the bill, and thereby generating a bar code unique to that store. In other embodiments, a GPS unit within mobile device 701 determines a location of the mobile device and logic on the device or the network correlates the location with a specific retailer, and thereby automatically determines the store number.

In either case, the user also has to authenticate via a credential such as PIN 753. This ensures that an unauthorized user is not making a mobile payment via a stolen mobile device. Upon filling the form, the user can hit the Request Key button 755 to receive a payment key, which is encoded on an image and either transmitted via a picture message, or directly to the application running on mobile device 701. Alternatively, the user can select Options 754 to perhaps add a maximum amount for the transaction, change the lifespan/duration of validity of the key to be generated, and adjust other features of the mobile payment application 751.

Figure 8:
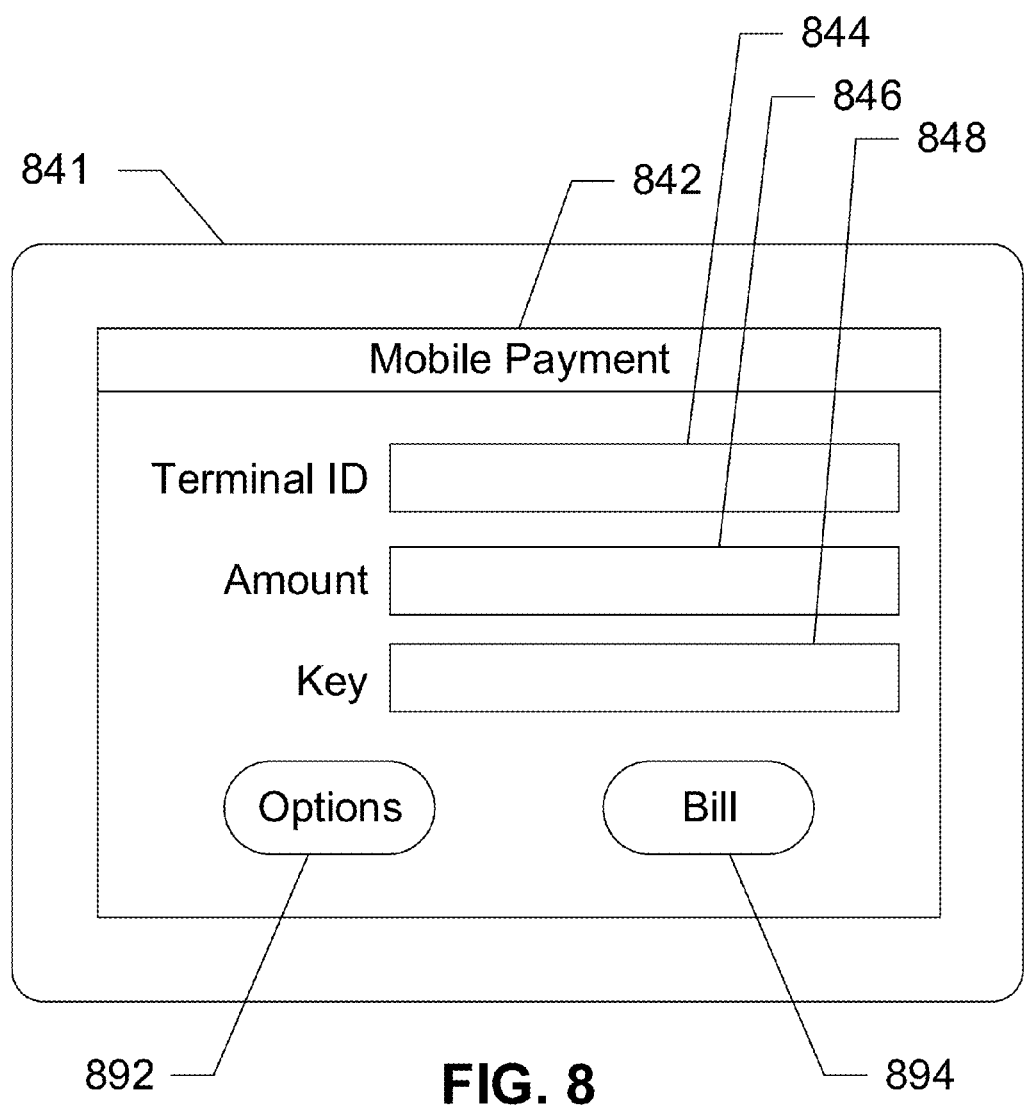
FIG. 8 shows a screenshot of an application interface for submitting a bill at a POS terminal, according to an exemplary embodiment of the present invention.

FIG. 8 shows an interface for receiving mobile payments, according to an exemplary embodiment of the present invention. In this embodiment, a POS terminal 841 uses interface 842 to accept a payment key in the form of a bar code scanned from a display of a mobile device. Interface 842 includes fields for terminal ID 844, an amount 846, and a payment key 848 extracted from the scanned bar code. An options button 892 allows a casher/operator of the POS terminal to adjust settings of the scanner, bill generation, connection options, etc. A bill 894 button generates a bill including the information in the fields, and transmits the bill to an authentication server across a network. The terminal ID and payment key fields may be auto-populated, so that in operation, all a cashier has to do is total up the amount, scan the mobile device, and submit the bill.

As will be understood by those having ordinary skill in the art upon reading this disclosure, the present invention can be incorporated in several settings, and modifications can be implemented to facilitate such incorporation. For instance, optical scanners can be coupled to gas pumps, vending machines, or turnstiles for mass public transit systems such as subways. A user would use a mobile device to dial into/connect to an authentication server, authenticate, and receive an image containing a payment key. The user scans the image using a scanner coupled to the vending machine or subway turnstile. Upon successful billing, the user would be allowed through the turnstile, or allowed to purchase a product from the vending machine. In this embodiment, the authorization loop described above need not be used. Instead, a maximum amount can be set for the transaction depending on, for instance, the regular cost of using the mass public transit system. For more secure applications on capable devices, additional layers of biometric identifiers can be used such as fingerprint scanning, finger capillary patterns, etc.

Further, although the present invention enables basic mobile devices having displays and picture-messaging capabilities to perform mobile payments, a slightly more advanced device includes an application on a user interface enabling a user to program different types and amounts of payment for different applications. For instance, a subway turnstile payment can be selected by a user on a menu on said application. For a more complex payment such as at a grocery store, a separate menu option allows the user to enable an authorization loop. Further, banking applications can allow a user to withdraw and/or extract money from an automated teller machine, or provide their identity to a bank teller, simply by using the bar code payment key acquired from the server on the network. In alternate embodiments, the payment key is a credit card number, bank account number, or equivalent, and therefore does not expire after a one-time use or a predetermined time period. Several other applications and configurations are possible. A user can provision the service before a first-time use by accessing a web-site or by contacting the cellular network operator to set up the service.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A non-transitory computer-readable medium having instructions stored thereon which, when executed by a processor of a computer, cause the computer to perform operations comprising:
receiving a key request from a mobile device performing a transaction with a point-of-sale terminal, the key request being provided via a user interface of the mobile device, and the key request comprising a store identifier identifying a store with which the point-of-sale terminal is associated;
in response to receiving the key request, generating an image comprising a payment key;
transmitting the image to the mobile device;
receiving a bill from the point-of-sale terminal, the bill comprising the payment key extracted from the image by the point-of-sale terminal, a terminal-input store identifier, and an amount to be charged;
determining whether the store identifier received in the key request is the same as the terminal-input store identifier received in the bill; and
in response to determining that the store identifier is the same as the terminal-input store identifier, causing a user account associated with the mobile device to be charged the amount to be charged.

2. The non-transitory computer-readable medium of claim 1, wherein the operations further comprise authenticating the mobile device by comparing a unique identifier received from the mobile device with an authentication database.

3. The non-transitory computer-readable medium of claim 2, wherein the unique identifier comprises a username, a password, or a biometric identifier.

4. The non-transitory computer-readable medium of claim 2, wherein the unique identifier comprises a voice sample.

5. The non-transitory computer-readable medium of claim 1, wherein the payment key comprises a bar code.

6. The non-transitory computer-readable medium of claim 1, wherein transmitting the image to the mobile device comprising transmitting the image to the mobile device via a picture message.

7. The non-transitory computer-readable medium of claim 1, wherein transmitting the image to the mobile device comprises transmitting the image to the mobile device via a direct connection between the computer and an application executing on the mobile device.

8. The non-transitory computer-readable medium of claim 1, wherein the operations further comprise verifying that the payment key in the bill is valid, and wherein the payment key is rendered invalid upon expiration of a time period.

9. The non-transitory computer-readable medium of claim 1, wherein the operations further comprise transmitting an authorization request to the mobile device to confirm an amount larger than a predetermined amount.

10. The non-transitory computer-readable medium of claim 1, wherein causing the user account associated with the mobile device to be charged the amount to be charged comprises transmitting a billing request to a billing server.

11. A point-of-sale terminal comprising:
a processor; and
a memory that stores instructions that, when executed by the processor, cause the processor to perform operations comprising
receiving output of a scanner that is in communication with the point-of-sale terminal, the output comprising results of the scanner scanning an image displayed on a display of a mobile device, the image comprising a payment key and being generated at a server in response to a key request submitted by the mobile device, and the key request comprising a user-input store identifier,
extracting the payment key from the image,
generating a bill, the bill comprising the payment key, a terminal-input store identifier, and an amount to be charged, and
transmitting the bill to the server so that the server can determine whether the terminal-input store identifier is the same as the user-input store identifier and, in response to determining that the terminal-input store identifier is the same as the user-input store identifier, cause a user account associated with the mobile device to be charged the amount to be charged.

12. The point-of-sale terminal of claim 11, wherein the operations further comprise receiving an insufficient funds notification from the server.

13. The point-of-sale terminal of claim 12, wherein the operations further comprise suggesting an alternative payment method to a user associated with the mobile device.

14. The point-of-sale terminal of claim 11, wherein the image comprises a bar code.

15. The point-of-sale terminal of claim 14, wherein the operations further comprise translating the bar code into an alphanumeric string.

16. A mobile device comprising:

a display;

a processor; and a memory that stores instructions that, when executed by the processor, cause the processor to perform operations comprising receiving input of a user-input store identifier identifying a store associated with a point-of-sale terminal, generating a key request, the key request comprising the user-input store identifier, transmitting the key request to a server, receiving an image from the server, the image comprising a payment key, presenting the image on the display so that a scanner associated with the point-of-sale terminal can scan the image to extract the payment key from the image, generate a bill comprising the payment key, a terminal-input store identifier, and an amount to be charged, and send the bill to the server so that the server can determine whether the terminal-input store identifier is the same as the user-input store identifier, and receiving an indication that a user account associated with the mobile device has been charged the amount to be charged in response to the server determining that the terminal-input store identifier is the same as the user-input store identifier.

17. The mobile device of claim 16, wherein the operations further comprise receiving a suggestion of an alternative payment method from the point-of-sale terminal in response to the server determining that the terminal-input store identifier is not the same as the user-input store identifier.

18. The mobile device of claim 16, wherein receiving the image from the server comprises receiving the image via a picture message.

19. The mobile device of claim 16, wherein the operations further comprise transmitting a unique identifier to the server so that the server can compare the unique identifier with an authentication database.

20. The mobile device of claim 19, wherein the user identifier comprises a username, a password, or a biometric identifier.

* * * * *